Dec. 4, 1934.  B. G. CARLSON ET AL  1,982,635
AIR DRIVEN GYROSCOPE
Filed Jan. 28, 1931  3 Sheets-Sheet 2

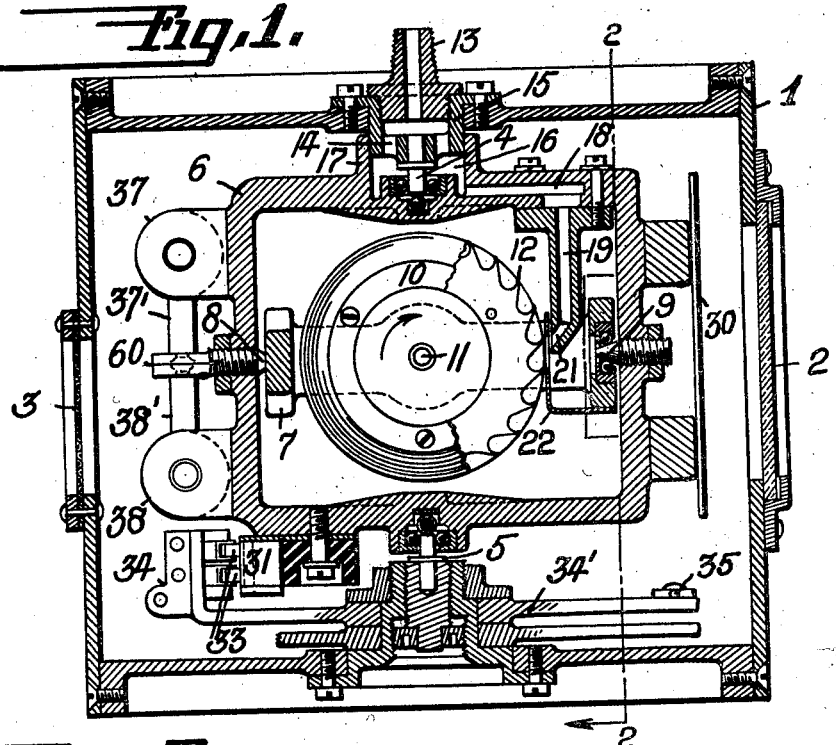

INVENTORS
Bert G. Carlson and
Herbert H Thompson.
BY Herbert H. Thompson
their ATTORNEY.

Dec. 4, 1934.   B. G. CARLSON ET AL   1,982,635
AIR DRIVEN GYROSCOPE
Filed Jan. 28, 1931   3 Sheets-Sheet 3

INVENTORS.
Bert G. Carlson and
Herbert H. Thompson.
BY
Herbert H. Thompson
ATTORNEY.

Patented Dec. 4, 1934

1,982,635

UNITED STATES PATENT OFFICE 1,982,635

AIR DRIVEN GYROSCOPE

Bert G. Carlson, Elmhurst, N. Y., and Herbert H. Thompson, Mountain Lakes, N. J., assignors to Sperry Gyroscope Company, Inc., Brooklyn, N. Y., a corporation of New York Application January 28, 1931, Serial No. 511,800

8 Claims. (Cl. 74—5)

This invention relates to gyroscopes possessing three degrees of freedom. A well known example of such type of gyroscope is the directional gyroscope employed for steering torpedoes and aircraft, and to some extent in aircraft as direction indicators for replacing or supplementing the compass and/or the turn indicator. It is well known that the spinning axis of such gyroscopes has a tendency to become inclined to the horizontal so that in short time they lose their directive value. Accordingly it has been proposed to mechanically centralize the gyroscope by a caging device to reset it at intervals. Such a device however, is usually manually operated and requires attention on the part of the operator. It is the purpose of the present invention to provide a means which automatically maintains the gyroscopic spinning axis substantially horizontal without interfering with its position in azimuth. Our invention is especially adapted to the air spun type of gyroscope and we preferably obtain our centralizing force by the reaction of the air jet drive. It is obvious, however, that our invention has a broader application than to directional air driven gyroscopes and may be employed on other types of free or partially free gyroscopes and other types of drive than air driven gyroscopes.

Referring to the drawings showing the preferred embodiments of our invention,

Fig. 1 is a vertical section of an air spun directional gyroscope employing our centralizing drive.

Fig. 2 is a vertical section taken on broken line 2—2 of Fig. 1, looking in the direction of the arrow.

Fig. 3 is a detail of the air jet and shield showing the position of the jets when the gyroscope is inclined.

Figure 4:
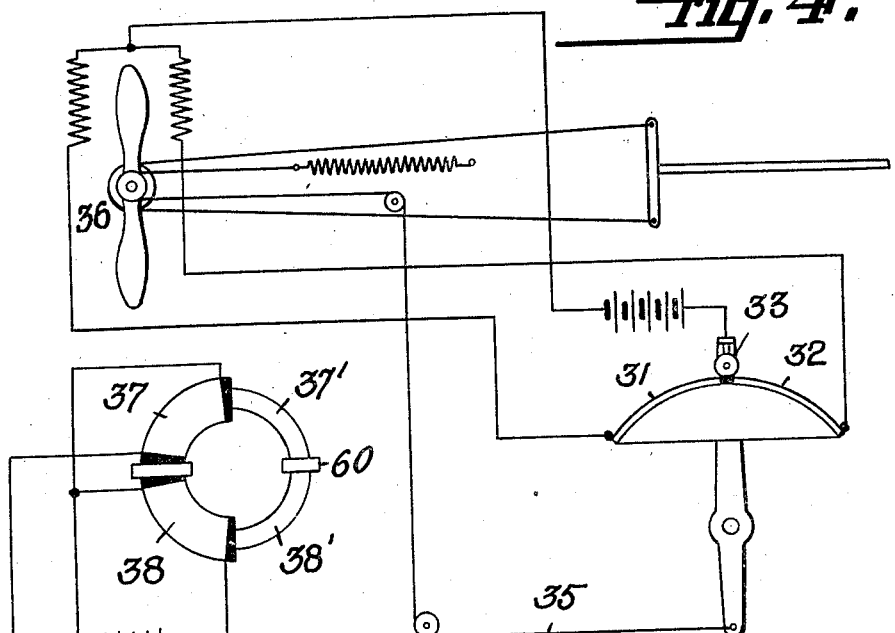
Fig. 4 is a diagram showing how our invention may be employed for automatic steering of aircraft.

The gyroscope of Fig. 1 is shown enclosed within a casing 1 having a front window 2 and an aperture 3 closed by wire gauze through which the used air from the air drive may escape. Within said casing is pivoted on vertical axis 4—5 a vertical ring 6 and within said vertical ring is mounted a rotor bearing frame 7 on horizontal trunnions 8 and 9. The gyro rotor proper 10 is journalled on a horizontal spinning axis 11 in said frame 7, the axis 11 being preferably at right angles to the axis 8—9. Such a mounting is said to give the gyroscope three degrees of freedom, which, in this instance, comprises freedom about the vertical axis, the horizontal axis of oscillation, and the horizontal axis of spin. It is obvious that these axes may be interchanged or varied at will and still have three degrees of freedom or any equivalent mounting employed.

The rotor is shown as provided with buckets or blades 12 in the periphery thereof by which the rotor is driven from one or more air jets. Either a pressure or vacuum system may be employed for the drive, but in this instance we have shown a pressure drive, the air being taken in through a hose (not shown) coupled to hose coupling 13 and passing from thence to channels 14 in the sleeve member 15, thence into the space 16 in the outer sleeve 17 on the vertical ring, and thence through the passage way 18 into the plurality of channels 19 leading to the jets 20—21.

Figure 5:
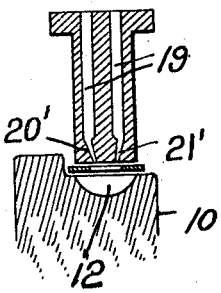
Fig. 5 is an enlarged sectional view of a modified form of air jets.

As stated above, we prefer to employ a plurality of jets, in the instance illustrated, two, which are preferably placed side by side in the same horizontal plane and slightly above the horizontal plane of the trunnions 8—9 so that the jets strike the bottom of the buckets approximately in the horizontal plane of the trunnions 8—9. By so positioning the jets an effective drive is obtained even if a large temporary relative inclination of the gyro rotor and vertical ring occurs. The jets are also positioned preferably an equal distance to each side of the central vertical plane of the rotor, or in other words, the vertical plane containing the pivots 8—9. Between the rotor and the jets we place a baffle plate 22. If the jets are secured to the vertical ring the baffle plate is secured to the frame 7 so as to oscillate therewith. Said baffle plate has therein a slot or aperture 23 having one edge thereof, preferably the upper edge, horizontal or parallel to the common plane of the two jets. Said upper edge preferably lies adjacent or slightly below the upper part of the jets as shown in Figs. 1 and 2 when the ring 7 is horizontal. If, however, said ring becomes inclined, or what amounts to the same thing, if there is relative inclination of the vertical ring 6 and the horizontal ring 7, the knife edge will be turned downwardly and intercept all or a greater portion of one of the jets. This results in a reaction of the intercepted jet on the baffle 22, which has its principal component in a horizontal direction, and since the jet lies to one side of the vertical plane of the pivots this will exert a torque about the vertical axis of the ring 6, thus causing precession of the gyroscope about its horizontal axis to restore it to its horizontal position. If the inclination occurs in the opposite direction it will be seen that the torque is in the opposite direction. The remaining jet, however, continues to drive the wheel and exerts no appreciable couple about the horizontal axis because when the ring 7 is inclined the uncovered jet will engage the bottom of the bucket substantially at the center thereof (see Fig. 3). In case parallel jets do not accomplish this action sufficiently, we may incline the jets slightly as shown in Fig. 5 at 20'—21', so that the jets are always pointing to the center of the bottom of the buckets so that no torque about the horizontal results when one jet is cut off.

Figure 6:
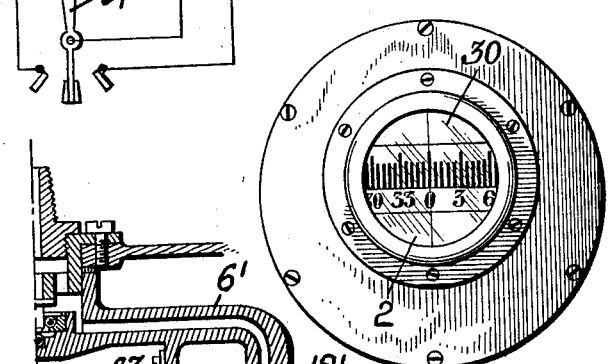
Fig. 6 is a face view of Fig. 1, showing how the device can be employed as a direction indicator on an aircraft panel.

It is obvious that our directional gyroscope may be employed either merely as a directional indicator by mounting a suitable graduated scale 30 on the vertical ring which may be viewed through the window 2 as shown in Fig. 6, or it may be employed as a directional unit of an automatic or semi-automatic steering gear as shown in Fig. 4. To this end the vertical ring may be provided with reversing contacts 31—32. For cooperating with the said contacts, there is shown a pair of trolleys 33 mounted on a bracket 34 which in turn is rotatably mounted at the base of the gyroscope, and to which the follow-up system may be connected by means of flexible wire 35. Said contacts and trolley are represented as controlling the air driven, electrically operated servo motor 36 which operates the rudder in the proper direction to bring the craft back to its course.

Figure 9:
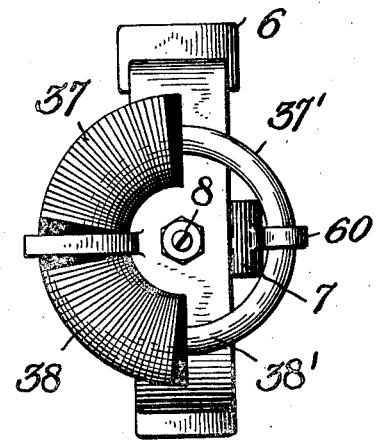
Fig. 9 is a detailed elevation of a portion of Fig. 1.

For changing course or correcting the position of the gyroscope if it strays, we have shown a pair of solenoids 37—38 mounted on the vertical ring. The circular cores 37', 38' of said solenoids are secured to an arm 60 projecting from the ring 7 (see Fig. 9). By exciting one or the other of the solenoids from controller 61 a torque may be exerted in one direction or the other about the horizontal axis of the gyroscope to cause precession thereof in azimuth and thus change the course or correct the gyroscope. Thus a source of power is provided for correcting the gyro position about both a vertical and a horizontal axis.

There is also shown in Fig. 2 the usual form of cage 40 for the gyroscope which may be manually operated to centralize and lock the gyroscope from the handle 41.

Figure 7:
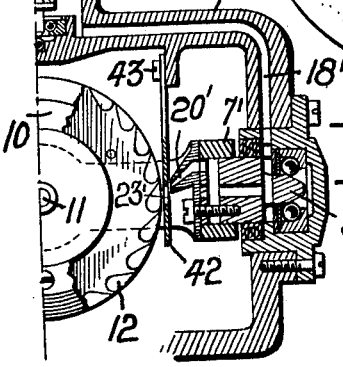
Fig. 7 is a detail showing a further modification in which a pendulum is employed as the vercal plane of reference instead of the vertical ring.

The form of the invention shown in Figs. 1 to 5 is especially adapted for a directional unit for gyro pilots for airplanes in which straight uniform flight is the rule. Where, however, the directional gyro is to be used as an indicating unit on a plane which maneuvers rapidly, the vertical ring might not form the best baseline from which to refer the relative inclination of the gyroscope on account of banking and pitching and rolling of the aircraft. It is also obvious that the mounting of the jets and baffle plate might be interchanged, i. e., the jets mounted on the horizontal ring 7 and the baffle plate on the vertical element. Both these modifications are suggested as combined in Fig. 7. In this figure an independent pendulum 42 is employed for maintaining the vertical. Said pendulum is shown as pivoted on the vertical ring about an axis 43 above but parallel to the axis 8—9 of the ring 7'. Said pendulum, therefore, is free to maintain the vertical on inclination of the ring 7' but cannot turn about the vertical axis except with the vertical ring 6'. The pendulum is shown as taking the place of the baffle 22 but since the pendulum is free to maintain the vertical it is necessary, in this instance, to mount the pair of air jets 20' on the ring 7'. For this purpose passage-way 18' through the vertical ring leads into the hollow trunnion 9' and from thence to the jets 20'. These jets are positioned as before on each side of the vertical central plane of the pivots 8'—9' and the slot 23' in the pendulous baffle plate is positioned as before with an edge designed to cut off one of the jets upon relative inclination of the ring and pendulum. It is obvious that a torque will be exerted about the vertical axis of the gyroscope in such event as in the form of the invention shown in Fig. 1.

Figure 8:
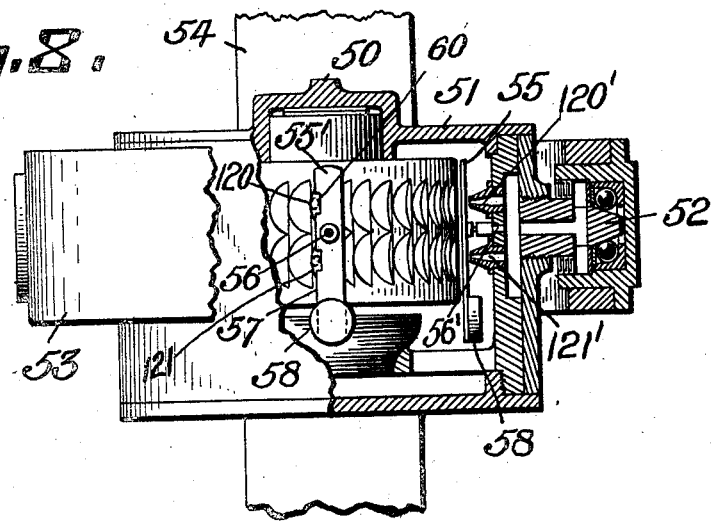
Fig. 8 shows how our invention may be employed on a gyro vertical or artificial horizon.

It is also obvious that in its broad aspect our invention also has application to other types of free gyroscopes which it is desired to keep in a horizontal or vertical plane without making the device pendulous. In Fig. 8 we show our invention as applied to a gyro vertical or artificial horizon. Such a gyroscope is usually supported on a normally vertical spinning axis 50 in a rotor bearing frame or casing 51 which is journalled for oscillation about a horizontal axis 52 in gimbal ring 53, which in turn is journalled for rotation about a perpendicular horizontal axis in a fixed support 54. As before, a pair of jets, and preferably two pairs of jets 120, 121 and 120', 121', are provided to drive the wheel. In this instance the jets of each pair are arranged one above the other equi-distant on either side of the axis 52 of casing 51 and of the gimbal axis. The jets, therefore, in the form illustrated, tilt with the gyroscope. For supplying a vertical reference device we have shown vertical blades 55, 55' pivoted on axes 56, 56' preferably in line with the trunnion axes of the gyroscope and to one side of the vertical line connecting the jets. The edge 57 of said blades preferably lies tangential to the cross-sectional periphery of the jets and the blades are preferably made pendulous as by weights 58. Edge 57 may be cut away near each jet, as at 60, to bring the jets where they pass the blade close to the center line of the gyroscope so that they strike the buckets on said line. It will readily be seen, therefore, that upon inclination of the gyro casing in a clockwise direction, for instance in Fig. 8, the upper jet 120 will intersect the blade, thereby exerting a torque on the blade about an axis perpendicular to the axis thereof, or in other words, about the axis 52 of casing 51 in gimbal ring 53, such torque being transmitted through the pivot 56. If, however, the gyroscope becomes inclined in the opposite direction, the lower jet exerts an opposite torque on the gyro frame about the same axis. There is thus exerted on the gyroscope an erecting force about an axis at right angles to the inclination which will cause the gyroscope to precess directly into the vertical. The action of blade 55' about the axis 52 of the gyroscope is similar so that an erecting torque is applied to the gyroscope for an inclination of the gyroscope about either horizontal axis.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. Thus our erecting device may also be employed on a pendulous gyroscope having a natural period of oscillation, in which type the device acts largely as a damper by directly reducing the tilt.

Having described our invention, what we claim and desire to secure by Letters Patent is:

1. A centralizing device for the gyro rotor of a free gyroscope having a rotor bearing frame and a pivotal support therefor comprising a plurality of air jets for spinning the rotor spaced axially at the periphery of the rotor and to each side of the center line of support of the rotor bearing frame, and means for intercepting the air stream from one of said jets upon inclination of the rotor bearing frame, with respect to said support, said means and jets being mounted one on said support and one on said frame.

2. A centralizing device for the gyro rotor of a free gyroscope having a rotor bearing frame and a pivotal support therefor comprising a plurality of air jets for spinning the rotor spaced axially at the periphery of the rotor and to each side of the center line of support of the rotor bearing frame, and means for intercepting the air stream from one of said jets upon inclination of the rotor bearing frame with respect to said support, said means and jets being mounted one on said support and one on said frame whereby a torque is exerted about the vertical axis of the device without exerting appreciable torque about the horizontal axis of said frame.

3. In an air driven directional gyroscope, a vertical ring mounted for rotation in azimuth, a gyro frame mounted for oscillation about a horizontal axis in said vertical ring, a gyroscopic rotor journalled in said frame, a plurality of air jets placed adjacent the horizontal axis of said frame, said jets being spaced apart in a horizontal plane one on each side of the central plane of said rotor, and a baffle plate between said jets and said rotor and having a horizontal edge, said jets and said baffle being mounted one on said frame and the other on the vertical ring whereby upon tilting of said frame the air from one of the jets engages said baffle more than the air from the other to exert a torque about the vertical axis of said ring.

4. In an air driven directional gyroscope, a vercal ring mounted for rotation in azimuth, a gyro frame mounted for oscillation about a horizontal axis in said vertical ring, a gyroscopic rotor journalled in said frame, a plurality of air jets adjacent the horizontal axis of said frame, said jets being spaced apart in a horizontal plane one on each side of the central plane of said rotor, and a normally vertical baffle plate between said jets and said rotor and having a horizontal edge whereby upon relative tilting of said frame and ring the air from one of the jets engages said baffle more than the air from the other to exert a torque about the vertical axis of said ring.

5. In an air driven directional gyroscope, a vertical ring mounted for rotation in azimuth, a gyro frame mounted for oscillation about a horizontal axis in said vertical ring, a gyroscopic rotor journalled in said frame, a plurality of air jets secured to the gyro frame and placed adjacent the horizontal axis of said frame, said jets being spaced apart in a horizontal plane one on each side of the central plane of said rotor, and a baffle plate on said vertical ring between said jets and said rotor and having a horizontal edge whereby upon tilting of said frame the stream from one of the jets engages said baffle more than the stream from the other jet to exert a torque about the vertical axis of said ring.

6. In an air driven directional gyroscope, a vertical ring mounted for rotation in azimuth, a gyro frame mounted for oscillation about a horizontal axis in said vertical ring, a gyroscopic rotor journalled in said frame, a plurality of air jets secured to the gyro frame and placed adjacent the horizontal axis of said frame, said jets being spaced apart in a horizontal plane one on each side of the central plane of said rotor, and a baffle plate, means for pendulously supporting the same on said vertical ring between said jets and said rotor and having a horizontal edge whereby upon tilting of said frame the stream from one of the jets engages said baffle more than the stream from the other jet to exert a torque about the vertical axis of said ring.

7. A centralizing device for the gyro rotor of a free gyroscope having a rotor bearing frame and a pivotal support therefor comprising a plurality of air jets for spinning the rotor spaced axially at the periphery of the rotor and to each side of the center line of support of the rotor bearing frame, blades on said rotor, and means other than the rotor blades for intercepting the air stream from one of said jets upon inclination of the rotor bearing frame to exert a torque around an axis of the gyroscope perpendicular to said axis of inclination.

8. The combination with a gyroscope having an air spun rotor mounted with three degrees of freedom for turning about two perpendicular axes and spinning about a third perpendicular axis, of means for maintaining the horizontality of at least one of said axes, comprising a plurality of driving jets adjacent the periphery of the gyro rotor for spinning the same and positioned to each side of a turning axis of the rotor, and means for intercepting the air stream from a jet upon inclination of the rotor about a turn axis for producing a reactive torque thereon about an axis at right angles to the axis of inclination.

BERT G. CARLSON.
HERBERT H. THOMPSON.